United States Patent [19]

Carlson et al.

[11] 4,227,665
[45] Oct. 14, 1980

[54] FIXED LEADING EDGE SLAT SPOILER FOR A HORIZONTAL STABILIZER

[75] Inventors: Floyd W. Carlson, Fort Worth; Michael L. Hester; David A. Popelka, both of Bedford, all of Tex.

[73] Assignee: Textron, Inc., Providence, R.I.

[21] Appl. No.: 904,813

[22] Filed: May 11, 1978

[51] Int. Cl.³ .............................................. B64C 21/02
[52] U.S. Cl. ................................ 244/210; 244/17.11; 244/213
[58] Field of Search ............. 214/210, 211, 213, 214, 214/204, 198, 17.11, 17.19, 87

[56] References Cited

U.S. PATENT DOCUMENTS

| | | | |
|---|---|---|---|
| 2,018,546 | 10/1935 | Clark | 244/211 |
| 2,464,663 | 3/1949 | Zingg | 244/204 X |
| 3,448,946 | 6/1969 | Nagatsu | 244/17.19 |
| 3,575,363 | 4/1971 | Jenny et al. | 244/211 X |

FOREIGN PATENT DOCUMENTS 850509 12/1939 France ............................ 244/214

OTHER PUBLICATIONS

Hoerner, "Fluid Dynamic Lift", 1975–Chapter VI, Leading Edge High-Lift Devices.

*Primary Examiner*—Barry L. Kelmachter
*Attorney, Agent, or Firm*—Richards, Harris & Medlock

[57] ABSTRACT

A horizontal stabilizer structure for improved stabilizer performance at positive and negative angles of attack is disclosed in which a leading edge slat/spoiler extending lengthwise along the stabilizer is disposed forward and below the leading edge of the stabilizer. The leading edge slat/spoiler directs airflow along the under surface of the stabilizer at negative attack angles and disrupts airflow over the upper surface at positive attack angles.

11 Claims, 4 Drawing Figures

FIXED LEADING EDGE SLAT SPOILER FOR A HORIZONTAL STABILIZER

BACKGROUND OF THE INVENTION

This invention relates to helicopters, and more particularly to the provision of a fixed leading edge slat/spoiler mounted on horizontal stabilizers to optimize stabilizer performance for the high aerodynamic angle of attack range and also to act as a spoiler for descending flight to reduce the stabilizer lift capability.

Horizontal stabilizers are provided on helicopters and are either of the fixed or controllable type. In the maneuvering of helicopters when in high power climb, it is desired to maintain a high downlift by the horizontal stabilizer. At high inflow angles to the rotor disk, as in high power climb, the damping moment of the rotor decreases thereby reducing the rotor stability. Under such conditions, high downlift from the stabilizer is highly desirable in order to retain fuselage stability. During descent, the rotor has a greater damping moment and is more stable. It is then possible to reduce the stabilizer contribution to airframe stability by stalling the stabilizer to reduce the uplift it provides. At the same time, it is desired to maintain the necessary construction in as simple a form as possible.

It has been found that by suitably applying slats to the stabilizer, a fixed stabilizer can be employed thereby eliminating control surfaces for such stabilizer and at the same time substantially increasing the permissible range for the negative angle of attack without stall. It has been the experience that in high power climbs the stabilizer will stall out, thus eliminating the downlift generated thereby. In such case, the tail of the helicopter comes up and the motion of the ship as it moves through the air is somewhat akin to that of a porpoise through water. With application of instrument flight controls, it is still further necessary to minimize the undesired motions of the aircraft. The present invention provides for operation of the stabilizer in a manner to enhance the flight characteristics of the aircraft with minimum of structure.

SUMMARY OF THE INVENTION

In accordance with the present invention a helicopter having fixed horizontal stabilizers is provided with a leading edge slat/spoiler extending parallel along each stabilizer and supported by a plurality of brackets with each slat/spoiler extending down and aft at a predetermined spacing ahead of and below the leading edge of the stabilizer.

DESCRIPTION OF THE DRAWINGS

For a more complete understanding of the present invention and for further objects and advantages thereof, reference is now had to the following description taken in conjunction with the accompanying drawings in which.

DETAILED DESCRIPTION OF THE INVENTION

Figure 2:
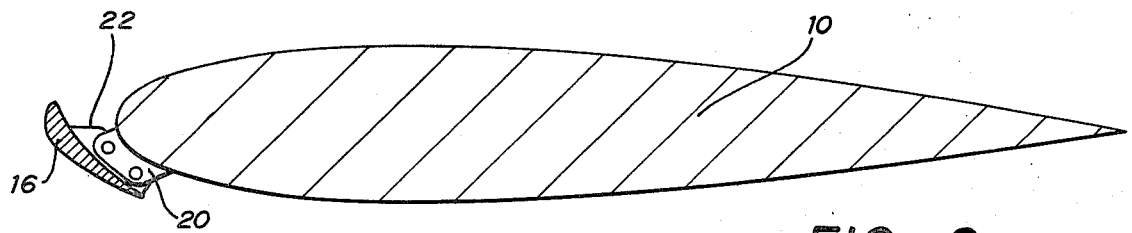
FIG. 2 is a sectional view taken along lines 2—2 of the horizontal stabilizer with leading edge slat/spoiler of FIG. 1.
Figure 1:
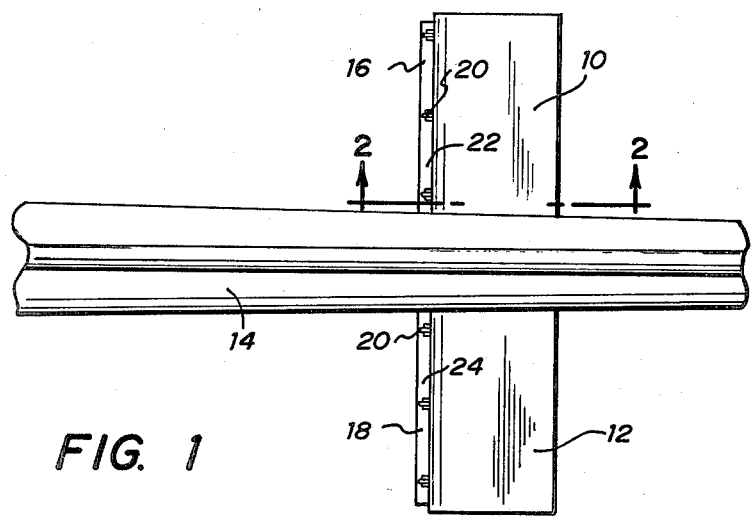
FIG. 1 is a plan view of horizontal stabilizers having a leading edge slat/spoiler according to the present invention.

FIGS. 1 and 2 show horizontal stabilizers 10 and 12 as deployed on either side of a helicopter tailboom 14. Slat/spoilers 16 and 18 are connected for support to the leading edges of stabilizers 10 and 12 respectively by means of a plurality of brackets 20. An air gap 22 is formed between the slat/spoiler 16 and the stablizer 10 and an air gap 24 is formed between the slat/spoiler 18 and the stabilizer 12.

Slat/spoilers 16 and 18 are disposed forward and below the leading edges of the horizontal stabilizers 10 and 12. The slat/spoilers have a negative camber and are disposed so as to direct airflow across the under side of the stabilizers at negative angles of attack.

Figure 3:
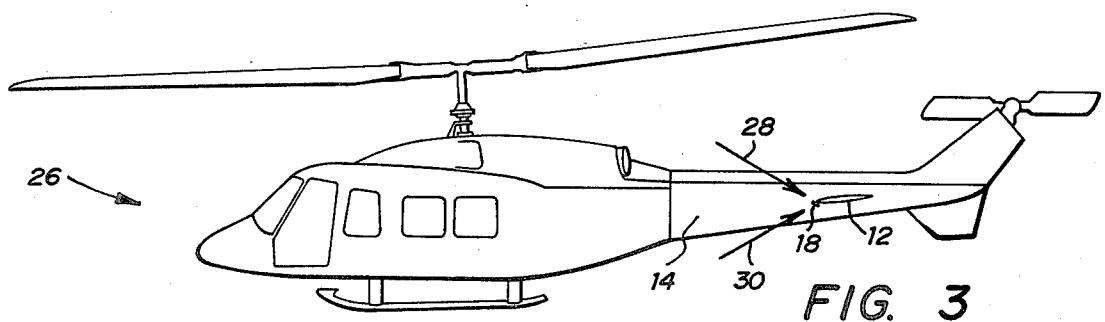
FIG. 3 is an elevation view of a helicopter having fixed horizontal stabilizers together with the leading edge slat/spoilers in accordance with the present invention.

The horizontal stabilizers 10 and 12 are mounted on the tailboom 14 of a helicopter 26 as shown in FIG. 3.

A horizontal stabilizer provides a helicopter with enhanced pitch stability, particularly in forward flight and climb. During a forward climb the horizontal stabilizer maintains a downlift on the helicopter fuselage as long as the airflow over the stabilizer is smooth. But when the angle of attack reaches the stall angle, the airflow becomes turbulent and the stabilizer loses a part of its downlift. The loss of this downlift force reduces the stability of the helicopter making it more difficult for the pilot to maintain proper control of the aircraft.

In descending flight, stabilization is much less of a problem since the rotor maintains a substantial damping moment which stabilizes the aircraft. With such stability, it is desirable to reduce the lift generated by the horizontal stabilizer by creating turbulent flow over the upper surface of the horizontal stabilizer. However, this turbulent state is not produced until the stall angle with a positive angle of attack is reached.

The leading edge slat/spoiler 16 and 18 of the present invention provide enhanced helicopter performance by increasing the negative attack stall angle to maintain stability at high climb rates while at the same time decreasing the stall angle at positive angles of attack to reduce stabilizer lift during descent.

Operation of the stabilizer and leading edge slat/spoilers at high climb rates is described by reference to FIGS. 2 and 3. During a forward climb the helicopter 26 tilts slightly forward from the horizontal which together with the climb angle produces a partially downward flow of air over the horizontal stabilizers 10 and 12. This airflow is in the direction of arrow 28. When the angle of attack reaches the stall angle, the horizontal stabilizers stall and the helicopter 26 loses a substantial degree of stability. The stall occurs when the airflow beneath the stabilizer becomes turbulent. But, with the addition of the slat/spoilers 16 and 18, air is captured in the air gaps 22 and 24 and redirected over the lower surface of the stabilizers 10 and 12. The added airflow beneath the stabilizers increases the attack angle at which the stabilizer can operate before turbulence is encountered. In addition, the velocity of the redirected airflow is increased by the venturi shape of the air gaps 22 and 24. The added velocity also tends to increase the angle of attack range within which smooth flow is maintained across the under surface of the stabilizer. Therefore, with the addition of the slat/spoilers 16 and 18 the stabilizer maintains downlift on the fuselage for greater negative attack angles than possible without the slat/spoilers.

In descent, it is desirable to obtain turbulent flow over the upper surface of the horizontal stabilizers 10 and 12 at low attack angles to reduce the lift provided by the stabilizers. As the helicopter 26 is descending the rotor has a substantial damping moment to maintain the necessary airframe stability. Airflow direction for a positive angle of attack is shown by arrow 30. The slat/spoilers 16 and 18 reduce the positive attack stall angle by disrupting the flow of air over the leading edge of the horizontal stabilizers at lesser positive attack angles. Therefore, in descending flight, the slat/spoilers 16 and 18 generate turbulent flow over the upper surface of the stabilizer at lesser attack angles to thereby enhance the flight characteristics of the helicopter.

Figure 4:
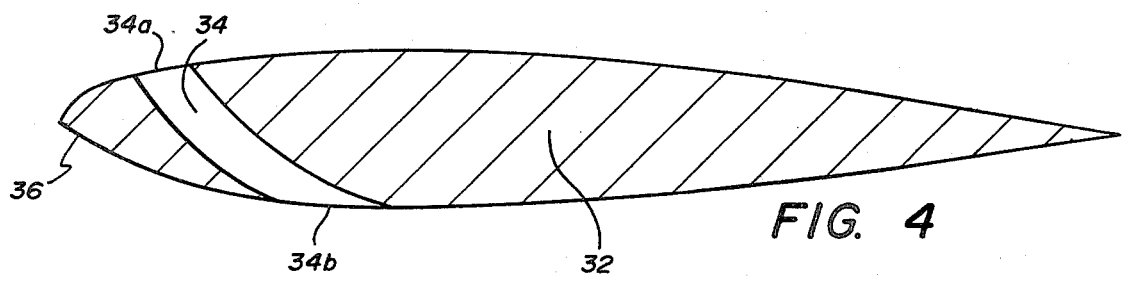
FIG. 4 is a sectional view of a horizontal stabilizer with a leading edge slat/spoiler in accordance with the present invention.

A further embodiment of the present invention is illustrated in FIG. 4. A horizontal stabilizer 32 is shown in a sectional view with a leading edge slot 34 having an inlet 34a and an exhaust 34b. Slot 34 becomes progressively narrower from the inlet 34a to the outlet 34b. A nose section 36 of the horizontal stabilizer is disposed forward of the slot 34.

Slot 34 functions in a manner very similar to the slat/spoilers 16 and 18 described above, but offers less drag. At negative attack angles, air is captured by the slot 34 at the inlet 34a and redirected over the lower surface of the stabilizer 32. This redirected air tends to maintain a smooth flow over the lower surface and thereby increase the attack angle that can be attained without stall. The velocity of the airflow through the slot 34 is increased somewhat by the venturi shape of the slot.

The nose section 36 of the horizontal stabilizer in this embodiment is sharper than that illustrated in FIG. 2. The sharper leading edge reduces the stall angle at a positive angle of attack. As the aircraft descends and it is desired to reduce lift, the nose section 36 creates turbulent flow over the upper surface of the horizontal stabilizer 32 at a lesser angle of attack. The turbulent flow causes a reduction of lift.

Thus, the present invention provides a helicopter horizontal stabilization structure with a leading edge slat/spoiler to enhance the helicopter stability and peformance at both positive and negative angles of attack.

By way of example and in accordance with the preferred mode of the present invention a leading edge slat/spoiler was applied to the stabilizer on the Bell Helicopter Company model 222 helicopter. In that helicopter each stabilizer had a chord length of about 26¾", a span of about 50" and a maximum thickness of about 15% of the chord length. In that case, the chord of the slat/spoiler was about 10% of the chord of the stabilizer and was mounted with a gap of about 2% of the stabilizer chord. The slat/spoiler was mounted ahead of and extended from above the chord line rearwardly and beneath the nose of the stabilizer. The length of the slat/spoiler approximated the length of the stabilizer. In this embodiment, the curvature of the trailing surface of the slat/spoiler was slightly less than the curvature of the leading surface of the stabilizer. The minimum gap between the trailing edge of the slat/spoiler and the leading edge of the stabilizer is located at about the point where a perpendicular line extending between the trailing edge of the slat/spoiler and the leading edge of the stabilizer would be oriented at about an angle of 45° with respect to the chord of the stabilizer.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. In a helicopter having a horizontal stabilizer, the combination therewith comprising:
    (a) a leading edge slat/spoiler parallel to said stabilizer, and
    (b) a plurality of brackets supporting said slat/spoiler in position such that the slat/spoiler extends down and aft at a predetermined spacing ahead and below the leading edge of said stabilizer for early stall in descending flight as well as increasing the angle for stall in climbing flight.

2. The combination set forth in claim 1 wherein said leading edge slat/spoiler has a negative camber.

3. The combination set forth in claim 1 wherein said brackets support said slat/spoiler by attachment to the leading edge of said stabilizer.

4. The combination set forth in claim 1 wherein said leading edge slat/spoiler extends substantially the length of said stabilizer.

5. The combination set forth in claim 1 wherein said leading edge slat/spoiler extends above the chord line of said horizontal stabilizer.

6. In a helicopter having horizontal stabilizers, the combination therewith comprising,
    (a) a negative camber slat/spoiler spaced forward and parallel to the leading edge of each horizontal stabilizer for directing airflow across the under surface of each horizontal stabilizer, and
    (b) a plurality of brackets connected to said stabilizers for supporting said slat/spoilers in a position such that said slat/spoilers extend down and aft at a predetermined spacing ahead and below the leading edge of said stabilizers for early stall in descending flight, as well as increasing the angle for stall in climbing flight.

7. The combination as recited in claim 6 wherein said slat/spoilers extend the full length of said stabilizers.

8. In a helicopter having a horizontal stabilizer, the combination therewith comprising a fixed leading edge slot open through the upper surface of the horizontal stabilizer aft of the leading edge and extending downward and rearward through the horizontal stabilizer to open through the lower surface of the horizontal stabilizer for early stall in descending flight as well as increasing the angle for stall in climbing flight.

9. The combination set forth in claim 8 wherein said slot continuously narrows from said upper surface to said lower surface.

10. The combination set forth in claim 8 wherein said slot extends the length of said horizontal stabilizer.

11. In a helicopter having a horizontal stabilizer, the combination therewith comprising structure forming a duct extending from adjacent to the upper leading edge surface of the horizontal stabilizer downward and rearward to the lower surface of the horizontal stabilizer for directing an airflow from the region of said upper surface over said lower surface for early stall in descending flight as well as increasing the angle for stall in climbing flight.

* * * * *